United States Patent
Adra et al.

(10) Patent No.: US 9,738,163 B2
(45) Date of Patent: Aug. 22, 2017

(54) ELECTRIC DRIVE HAVING AN ACTIVELY CONTROLLED DC BUS

(71) Applicant: Caterpillar Inc., Peoria, IL (US)

(72) Inventors: Rodwan Tarek Adra, Peoria, IL (US); Thomas Michael Sopko, Jr., East Peoria, IL (US); Jackson Wai, Dunlap, IL (US); Carlos Eduardo Nino Baron, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 52 days.

(21) Appl. No.: 14/558,001

(22) Filed: Dec. 2, 2014

(65) Prior Publication Data

US 2016/0152146 A1  Jun. 2, 2016

(51) Int. Cl.
| | |
|---|---|
| *H02P 27/00* | (2006.01) |
| *H02J 3/36* | (2006.01) |
| *B60L 11/08* | (2006.01) |
| *H02M 1/15* | (2006.01) |
| H02M 7/48 | (2007.01) |
| H02M 7/5387 | (2007.01) |
| H02M 1/00 | (2006.01) |

(52) U.S. Cl.
CPC .............. B60L 11/08 (2013.01); H02M 1/15 (2013.01); *H02M 7/4826* (2013.01); *H02M 7/5387* (2013.01); *H02M 2001/008* (2013.01); *Y02T 10/70* (2013.01); *Y02T 10/7077* (2013.01)

(58) Field of Classification Search
CPC ................................ H02P 31/00; B60L 11/00

USPC .................................................... 318/400.3
See application file for complete search history.

(56) References Cited

U.S. PATENT DOCUMENTS

| | | | |
|---|---|---|---|
| 4,685,044 A | 8/1987 | Weibelzahl et al. | |
| 5,751,138 A * | 5/1998 | Venkata | H02J 3/01 323/207 |
| 6,839,249 B2 * | 1/2005 | Kalman | H02M 7/4826 363/35 |
| 7,990,097 B2 | 8/2011 | Cheng et al. | |
| 8,188,692 B2 | 5/2012 | Kumar | |
| 8,324,846 B2 | 12/2012 | Marchand et al. | |
| 8,508,957 B2 * | 8/2013 | Sato | H02J 9/062 363/131 |
| 8,836,256 B2 * | 9/2014 | Vilar | H02P 23/14 180/65.1 |
| 9,099,934 B2 * | 8/2015 | Swamy | H02M 1/4216 |
| 2002/0037163 A1 | 3/2002 | Clark et al. | |
| 2008/0265808 A1 | 10/2008 | Sparey et al. | |

(Continued)

*Primary Examiner* — Bentsu Ro
*Assistant Examiner* — Zemenay Truneh
(74) *Attorney, Agent, or Firm* — Finnegan, Henderson, Farabow, Garrett & Dunner, LLP; Jeffrey A. Greene (57) ABSTRACT

The present disclosure is directed to an electric drive. The electric drive may include a first power inverter, a second power inverter, and a positive DC bus connecting the first power inverter and the second power inverter. The electric drive may also include a first switch connected to the positive DC bus between the first power inverter and the second power inverter. The electric drive may include a second switch connected to the positive DC bus between the first power inverter and the second power inverter. The electric drive may further include a control unit connected to the first switch and to the second switch. The control unit may be configured to selectively allow current to pass through the first switch and the second switch.

20 Claims, 5 Drawing Sheets

(56) References Cited

U.S. PATENT DOCUMENTS

| 2010/0066280 | A1 | 3/2010 | Marchand et al. |
| 2010/0096926 | A1* | 4/2010 | King ............... B60L 11/123 307/45 |
| 2013/0112507 | A1 | 5/2013 | Marvin |
| 2014/0159628 | A1 | 6/2014 | Brooking |
| 2015/0280597 | A1* | 10/2015 | Takase ............... H02M 1/12 323/271 |

* cited by examiner

FIG. 5

ELECTRIC DRIVE HAVING AN ACTIVELY CONTROLLED DC BUS

TECHNICAL FIELD

This disclosure relates generally to an electric drive and, more particularly, to an electric drive having an actively controlled DC bus.

BACKGROUND

Machines such as construction equipment, passenger vehicles, vocational trucks, and other machines known in the art are often equipped with electrical drive systems that include two or more power inverters. In some systems, the power inverters are separated by distances that necessitate DC link cables connecting the inverters. Because each of the power inverters contains one or more capacitors, a resonating current may arise that oscillates between the inductance of the interconnections in the DC link cables and the capacitance of each inverter. Resonating circuits of this type are often called "tank" circuits, due to the "sloshing" effect of current as it resonates between the capacitors.

One exemplary method used to control DC bus current is described in U.S. Pat. No. 8,188,692 (the '692 patent) filed by Kumar on May 29, 2012. The '692 patent describes a system that includes an electrical power modulation device coupled between two tractive banks that is configured to remove a resonance current. The '692 patent also describes a method of connecting multiple propulsion systems or system components via a contactor. In order to obtain isolation of these systems, the '692 patent describes inserting either diode rectifier systems or diodes between these systems to purportedly isolate traction motors, which may reduce or eliminate resonance currents that may occur between the motors.

Although the '692 patent describes a system for removing resonance current, it does not provide for bi-directional power flow between systems. The '692 patent also does not address active control of DC link resonance.

The system of the present disclosure is directed towards overcoming one or more of the problems as set forth above and/or other problems in the art.

SUMMARY

One aspect of the present disclosure is directed to an electric drive. The electric drive may include a first power inverter, a second power inverter, and a positive DC bus connecting the first power inverter and the second power inverter. The electric drive may also have a first switch connected to the positive DC bus between the first power inverter and the second power inverter. The electric drive may also include a second switch connected to the positive DC bus between the first power inverter and the second power inverter. The electric drive may further include a control unit connected to the first switch and to the second switch. The control unit may be configured to selectively allow current to pass through the first switch and the second switch.

Another aspect of the present disclosure is directed to a method for operating an electric drive system. The method may include inverting power at a first location, inverting power at a second location, passing power between the first and second locations, and monitoring a power characteristic at the first and second locations. The method may also include selectively interrupting the passing of power between the first and the second location based on the power characteristic. In response to a first power characteristic at the second location, the method may include applying a control signal to allow current to pass in a first direction. In response to a second power characteristic at the first location, the method may further include applying the control signal to allow current to pass in the second direction. In response to a third power characteristic at either the first location or the second location, the method may include ceasing the control signal to stop the current front passing in either of the first direction or the second direction. The method may further include monitoring the passing of power between the first and second locations, and removing an oscillation current between the first and second locations.

Another aspect of the present disclosure is directed to an electric drive. The electric drive may include a first power inverter, a second power inverter and a positive DC bus connecting the first power inverter and the second power inverter. The electric drive may also include a first switch connected to the positive DC bus between the first power inverter and the second power inverter. The electric drive may also include a second swatch connected to the first thyristor and the positive DC bus between the first power inverter and the second power inverter. The electric drive may further include a control unit connected to the first switch and to the second switch. The control unit may be configured to selectively allow current to pass through the first switch and the second switch.

DETAILED DESCRIPTION

Figure 1:
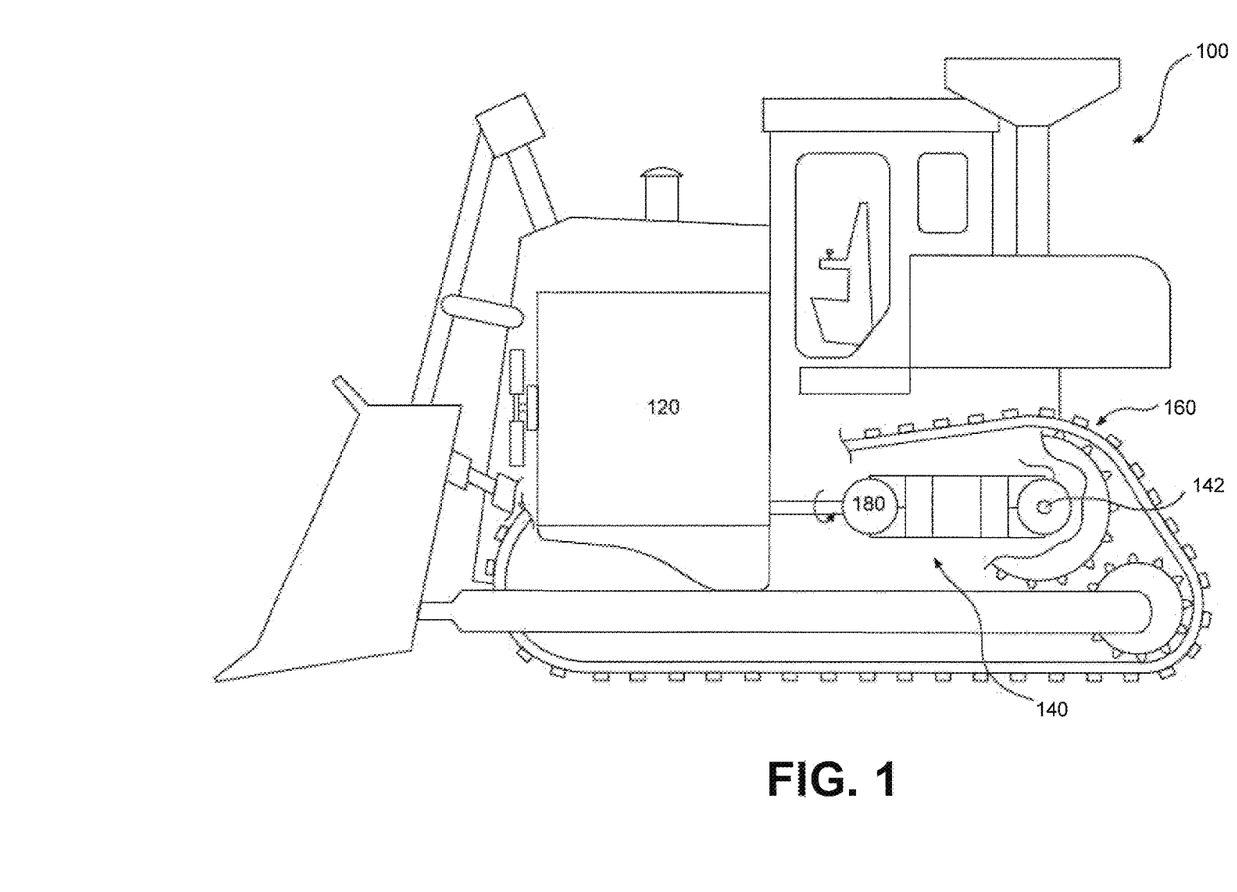
FIG. 1 is a pictorial illustration of a machine according to an exemplary disclosed embodiment.

FIG. 1 illustrates a machine 100 having a power source 120 and an electric drive 140 connected to a traction device 160. Machine 100 may be a mobile machine that performs some type of operation associated with an industry such as mining, construction, farming, transportation, or any other industry known in the art. For example, machine 100 may be an earth moving machine, a marine vessel, an on-highway passenger vehicle, or any other suitable mobile machine.

Power source 120 may be an engine, such as a diesel engine, a gasoline engine, a natural gas engine, or another appropriate engine. It is contemplated that electric drive 140 may be used with another type of power source such as, for example, a fuel cell.

Figure 2:
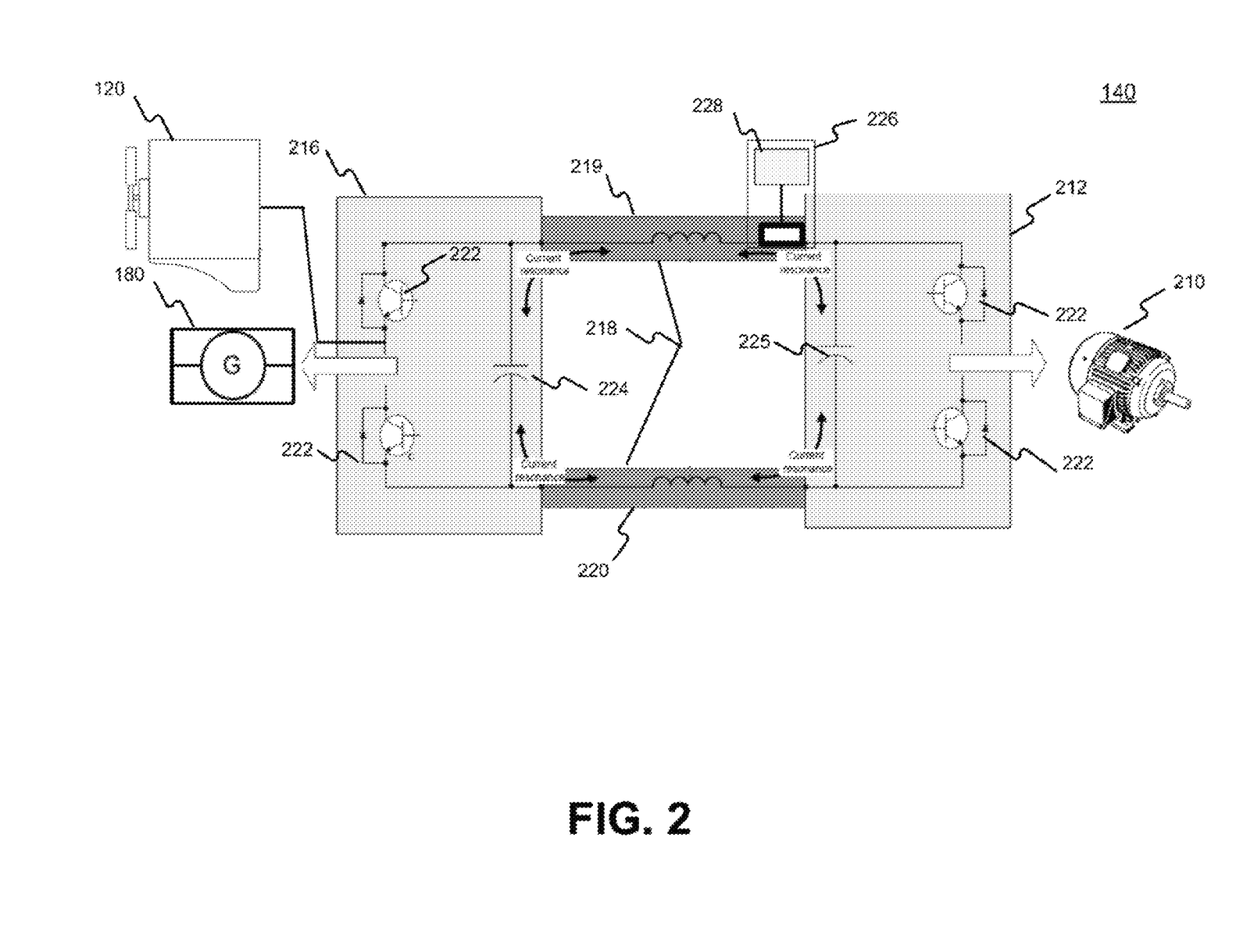
FIG. 2 is a schematic and diagrammatic illustration of an electric drive having an actively controlled DC bus that may be used in conjunction with the machine of FIG. 1.

As illustrated in FIG. 2, electric drive 140 may include a generator 180 to produce an output power directed to a common bus 218 and used to drive traction device 160 (depicted in FIG. 1) via a motor 210. Common bus 218 may include positive DC bus 219 and negative DC bus 220 that electrically connect power inverter 216, current control device 226 and traction inverter 212 connected to motor 210. Common bus 218 may also be electrically connected to additional power storage devices (not shown) and accessory power loads (not shown) to provide power to and/or to remove power from common bus 218. Current control device 226 may be in communication with traction inverter 212 via positive DC bus 219. Common bus 218 may be shared with power source 120, power inverter 216, and traction inverter 212. Power inverter 216 and traction inverter 212 may both include one or more DC bus capacitors 224 and 225 and a plurality of insulated gate bipolar transistor circuits 222. It is contemplated that any number of DC bus capacitors (e.g., 224 and 225) may be included in electric drive 140 according to the requirements of a particular application. Electric drive 140 may also include a current control device 226 connected to positive DC bus 219, and in communication with a controller 228.

Generator 180 may be a three-phase permanent magnet alternating field-type generator configured to produce a power output in response to a rotational input from power source 120. It is also contemplated that generator 180 may be a switched reluctance generator, a synchronous alternator, or any other appropriate type of generator known in the art. Generator 180 may include a rotor (not shown) rotatably connected to power source 120 by any means known in the art such as, for example, by a direct crankshaft connection, via a gear train, through a hydraulic circuit, or in any other appropriate manner. Generator 180 may be configured to produce electrical power output as the rotor is rotated within a stator (not shown) by power source 120. Generator 180 may be connected to positive DC bus 219 and negative DC bus 220 via power inverter 216, which may be configured to invert the three-phase alternating power to direct phase power.

Motor 210 may be a three-phase induction motor or a permanent magnet electric motor (e.g., a three phase permanent magnet synchronous machine (PMSM)) configured to receive power from common bus 218 and to cause movement of traction device 160. It is also contemplated that motor 210 may be a switched reluctance electric motor, an induction motor, or any other appropriate type of motor known in the art. Motor 210 may be connected to traction device 160 via a direct shaft coupling (not show), via a gear mechanism (not shown), or in any other manner known in the art.

DC bus capacitors 224 and 225 may be connected to common bus 218 via positive DC bus 219 and negative DC bus 220 and may have a desired voltage range. For the purposes of this disclosure, the desired voltage range may be defined as that voltage range recommended by the supplier of DC bus capacitors 224 and 225 for safe operation and may include an upper limit and a lower limit. It is also contemplated that the desired voltage range may be defined by motor and generator inverter power electronic limitations. The selection of a particular voltage range for DC bus capacitors 224 and 225 that may be implemented within electric drive 140 may be dependent upon the intended application. For example, electric drive 140 intended for operation in a lightweight passenger vehicle may include DC bus capacitors 224 and 225 having a desired voltage range of approximately 300-600 volts. Electric drive 140 intended for operation in a mining truck application may include DC bus capacitors 224 and 225 having a desired voltage range of approximately 1500 to 2500 volts.

Power inverter 216 may receive power from one or more power sources based on torque and speed commands, such as, for example, a battery (not shown), a hydrogen powered fuel cell (not shown), a supercapicitor (not shown), and/or one or more generators (e.g., generator 180). Power inverter 216 may receive AC power from generator 180, rectify the power to high voltage DC, and provide the power to traction inverter 212 via common bus 218.

Traction inverter 212 may provide AC power to motor 210, and may also provide torque and speed control for motor 210. Traction inverter 212 may receive high voltage DC power via common bus 218, and invert the DC power into multi-phase AC power. Power inverter 216 and traction inverter 212 may be a uni-directional or a bi-directional traction inverters. Power inverter 216 and traction inverter 212 may include one or more solid state devices including one or more diodes (not shown), one or more insulated gate bipolar transistors (IGBTs) 222, and/or one or more DC bus capacitors 225.

Traction device 160 (as depicted in FIG. 1) may be connected to motor 210, and may include any means for propelling machine 100 such as, for example, belts, tracks, tires, or any other means known in the art. It is contemplated that one or more traction devices 160 on a first side of machine 100 may be driven independent of one or more traction devices 160 on a second side of machine 100 (only one side shown), opposite the first.

Current control device 226 connected to positive DC bus 219 may work in conjunction with controller 228 to provide active control of the DC bus currents. Active control as used herein may include controlling the flow of power between power inverter 216 and traction inverter 212 based on one or more power characteristics, such as, for example, voltage, current, temperature, a positive torque command, a negative torque command, a velocity feedback loop used to control operational velocity of motor 210, and/or other characteristics. For example, current control device 226 may actively measure and/or monitor one or more power characteristics at traction inverter 212 and/or power inverter 216, and selectively allow, reduce, or stop the flow of power between the inverters based on the one or more power characteristics. As another example, current control device 226 may monitor voltage levels and/or torque commands on positive DC bus 219 and selectively reduce or remove ripple currents. The torque commands may be positive torque commands, which may include one or more control signals configured to cause motor 210 to transmit positive torque to traction device 160. In one aspect, the positive torque may cause machine 100 to increase its operational velocity by speeding up. In another aspect, negative torque commands may cause motor 210 to transmit negative torque to traction device 160, which may cause machine 100 to decrease its operational velocity and retard the speed of machine 100. In another aspect, a velocity feedback loop may cause motor 210 to increase or decrease its operational velocity. Current control device 226 may be in communication with controller 228, motor 210, generator 180, power inverter 216, and traction inverter 212, other vehicle controllers, and/or operator commands via common bus 218. Although depicted on positive DC bus 219, it is contemplated that current control device 226 may alternatively or additionally be located on negative DC bus 220. Electric drive 140 may include two or more current control devices 226.

As previously noted, controller 228 may also be in communication with motor 210 (or traction inverter 212) to monitor inputs to motor 210 indicative of a command speed or a command torque communicated to motor 210. Controller 228 may be in communication with one or more voltage sensors and/or current sensors (not shown) configured to monitor voltage and/or current at one or more particular locations of electric drive 140. For example, controller 228 may monitor voltage at positive DC bus 219, and responsive to the voltage reading, perform one or more actions to control power delivered via positive DC bus 219. Controller 228 may also monitor torque commands at positive DC bus 219, and responsive to the torque command, perform one or more actions to control power delivered via positive DC bus 219.

Controller 228 may be embodied in a single microprocessor or multiple microprocessors and could be integrated into the traction inverter controller for traction inverter 212 or power inverter controller for power inverter 216. Numerous commercially available microprocessors can be adapted to perform the functions of controller 228. For example, controller 228 may be a field-programmable gate array (FPGA). It should be appreciated that controller 228 could readily be embodied in a general machine microprocessor capable of controlling numerous machine functions.

Controller 228 may include any means for storing and comparing information and controlling an operating parameter of machine 100 such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with controller 228, including power supply circuitry, signal-conditioning circuitry, solenoid driver circuitry, communication circuitry, and other appropriate circuitry.

Common bus 218 may exhibit inductance that is inherent in the design of the bus. According to some embodiments, changes in flowing currents may be due to the switching of IGBTs (e.g., 222) in traction inverter 212 and power inverter 216. As a result of the bus inductance, the current flow changes may induce proportional voltages, which may oppose the change in current (e.g., self-inductance). The inductance in common bus 218 in connection with DC bus capacitors 224 and 225 may function as an LC (inductor-capacitor) circuit.

An LC circuit may create an oscillation of current by storing electrical energy oscillating at its resonant frequency. For example, DC bus capacitor 224 may store energy in the electric field between its plates, as a function of the voltage across capacitor 224. The inductance of common bus 218 may store energy in its magnetic field, as a function of the current flowing through it. DC bus capacitors 224 and 225 may be connected across one or more elements exhibiting inductive properties, such as, for example, common bus 218. As the current flow increases through common bus 218, the inductance of common bus 218 may increase the stored energy in the magnetic field of the inductance of common bus 218. As a result of the change in current through the inductance of the common bus 218, the voltage on DC bus capacitors 224 and 225 will increase and/or decrease. The changes in voltages of these capacitors are in opposite phase of each other such that as the voltage of DC bus capacitor 224 increases as the voltage of DC bus capacitor 225 decreases. Eventually the voltage on DC bus capacitors 224 and 225 builds in opposite directions to oppose the current flow through the inductance of the common bus 218 and the current through the bus reduces to zero. However, since the voltage between DC bus capacitors 224 and 225 are not equal, the current will begin to flow in the opposite direction and cause the voltage of DC bus capacitors 224 and 225, to increase and decrease in opposite directions in response to the change in current flow. The energy required to keep the charge flowing through the LC circuit may cause heating of DC bus capacitors 224 and 225 and the common bus 218. As a response to the absorption of this energy, the heating of DC bus capacitors 224 and 225 and common bus 218 may cause the sloshing of current to decline. When the energy is completely dissipated, the current may stop. However, if the voltage difference between DC bus capacitors 224 and 225 is not zero, then the cycle can begin again, with the current flowing in the opposite direction through the common bus 218 inductance.

The energy may oscillate back and forth between the capacitors and the inductance of common bus 218 until (if not replenished by power from an external circuit) internal resistance makes the oscillations die out. Its action, known mathematically as a harmonic oscillator, is similar to a pendulum swinging back and forth, or water sloshing back and forth in a tank. For this reason, the circuit is also called a "tank" circuit. The oscillation frequency is determined by the capacitance values of DC bus capacitors 224 and 225, and inductance values of common bus 218.

The excess current inherent in a tank circuit may have several disadvantages. Because of the constant charge/discharge cycle on the capacitors, the capacitors may become fatigued due to excess heat created by the ripple currents. Moreover, the common bus 218 may become extremely hot due to the excess currents.

Figure 3:
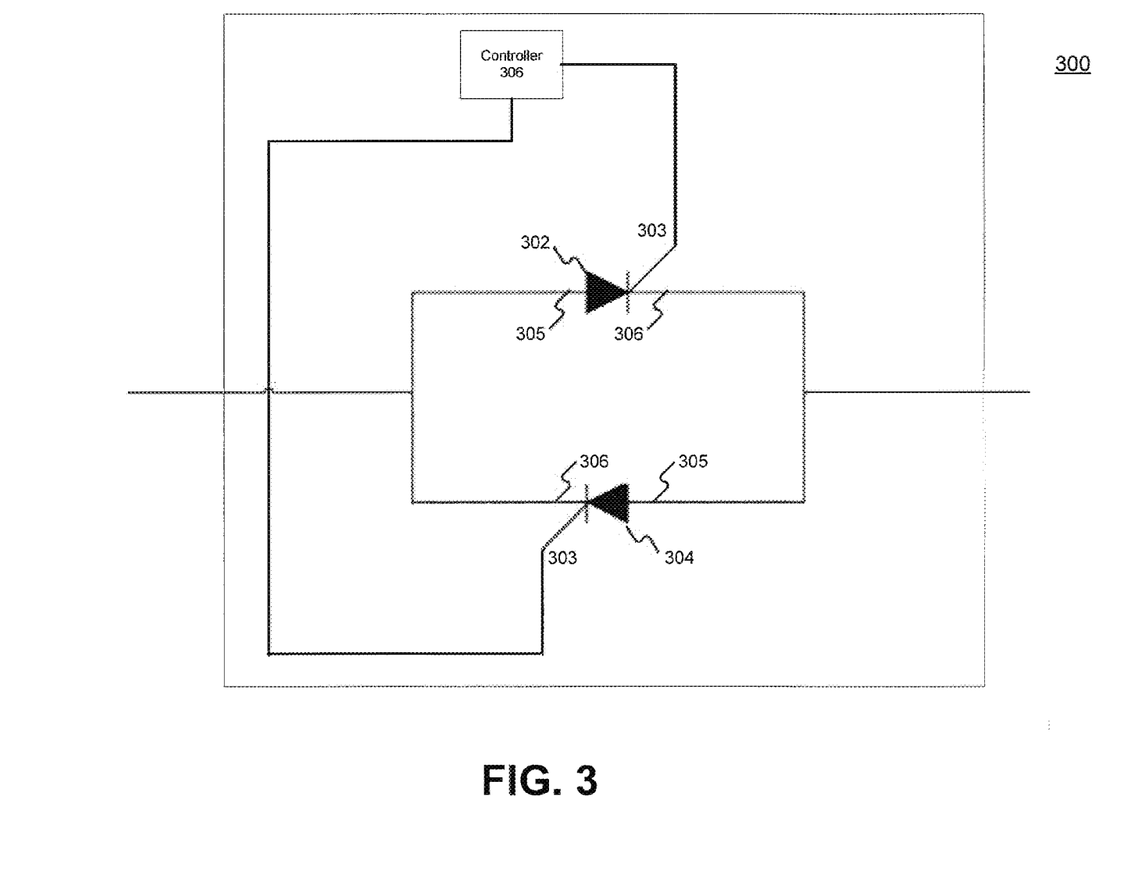
FIG. 3 is a schematic and diagrammatic illustration of an exemplary current control device that may be used in conjunction with the system of FIG. 2.

According to an exemplary embodiment, ripple currents may be reduced and/or eliminated by actively controlling the current on the DC bus. In one aspect, current control device 226 may be configured to actively control current in common bus 218. FIG. 3 depicts one exemplary embodiment for current control device 226 that may provide thyristor-based anti-ripple active control.

Referring now to FIG. 3, exemplary current control device 226 is shown that may be configured to reduce and/or eliminate ripple currents from electric drive 140. Current control device 226 may include two thyristors 302 and 304 (commonly known as silicon-controlled rectifiers, or "SCRs"), and controller 228.

Thyristors 302 and 304 may function as actively controlled gates that selectively allow current to pass from the anode side to the cathode side of each gate (e.g., anode portion 305 to cathode portion 306). Thyristors 302 and 304 may be connected to controller 228 via gate electrodes 303. Thyristors 302 and 304 may be four-layer solid state current controlling devices that allow current in one direction only, from anode portion 305 to cathode portion 306 when triggered by a positive current applied to each respective gate electrode 303. The current applied to each respective gate electrode 303 may be DC current, or a series of pulses. As used herein, a gate (e.g., thyristors 302 and 304) "opens" when current is applied to gate electrode(s) 303. In one aspect, controller 228 may provide a DC current through one or more of gate electrode(s) 303 to open one or more of thyristors 302 and 304. Thyristors 302 and 304 may be connected in parallel, with cathode portion 306 of thyristor 302 connected to anode portion 305 of thyristor 304, and cathode portion 306 of thyristor 304 connected to the anode portion 305 of thyristor 302. Thyristors 302 and 304 may be connected in-line with positive DC bus 219. As previously discussed, current control device 226 may be connected to negative DC bus 220 or positive DC bus 219.

Controller 228 may provide a series of pulses or DC to one or more of gate electrodes 303 to open one or more of thyristors 302 and 304. When controller 228 stops the flow of current to the gates of thyristors 302 and/or 304 and the current from anode portion 305 to cathode portion 306 decreases to zero of the respective thyristors 302 and/or 304, thyristor(s) 302 and/or 304 "close" and stop current from passing from anode portion 305 to cathode portion 306 of each respective thyristor 302 and/or 304.

Controller 228 may provide active control of current control device 226. By actively controlling the flow of power between power inverter 216 and traction inverter 212, controller 228 may determine a voltage level at traction inverter 212, and responsive to a low voltage level at traction inverter 212, open thyristor 302. In one aspect, it may be desirable to allow power to flow freely in both directions between traction inverter 212 and power inverter 216. Accordingly, controller 228 may monitor voltage and/or torque command at a particular location, and open both of thyristor 302 and thyristor 304 responsive to the monitored voltage and/or torque command. In another aspect, controller 228 may make a comparison of the voltage level to a predetermined "high" threshold at traction inverter 212, and may close both of thyristor 302 and thyristor 304 responsive to the comparison when the voltage level exceeds the predetermined high threshold. In another aspect, responsive to the monitored voltage, current control device 226 may open one or snore thyristors 302 and/or 304 partially providing a current pulse from controller 228. Accordingly, controller 228 may vary the current allowed through positive DC bus 219 responsive to the voltage level measurement by selectively increasing or decreasing the pulse frequency delivered to one or more of gate electrode(s) 303.

Figure 4:
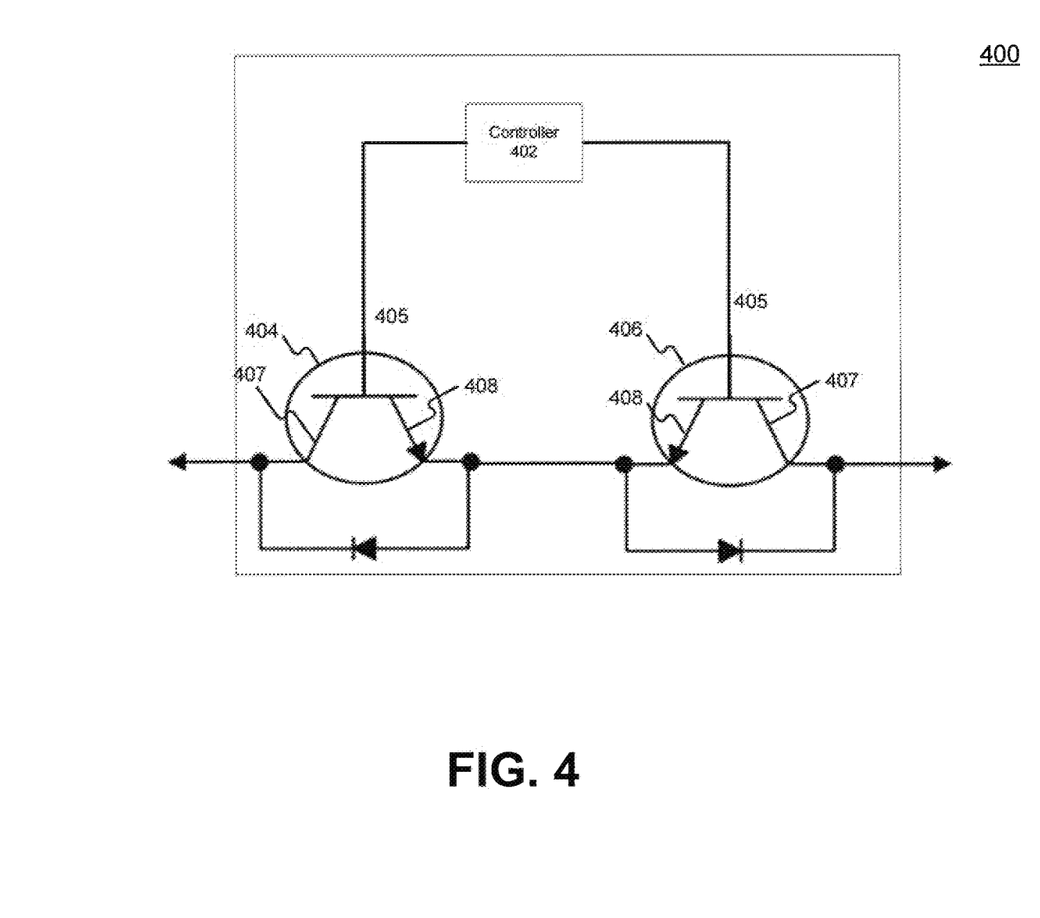
FIG. 4 is a schematic and diagrammatic illustration of an exemplary current control device that may be used in conjunction with the system of FIG. 2.

It is contemplated that insulated gate bipolar transistors (IGBTs) may be used in place of thyristors 302 and 304 if desired. FIG. 4 illustrates an exemplary current control device 400 for IGBT-based anti-ripple active control that may be used in place of current control device 226 in conjunction with the electric drive of FIG. 2. Current control device 400 may be substantially identical to current control device 226 with respect to programmable functionality. Current control device 400 may include two IGBTs 404 and 406, and controller 228.

IGBTs 404 and 406 may be three-terminal power semiconductor devices used as electronic switches. IGBTs 404 and 406 may be connected emitter 407 to emitter 407 or collector 408 to collector 408 (as depicted in FIG. 4), in series with each other, and in line with positive DC bus 219. IGBTs 404 and 406 may be connected to controller 228 via gate electrodes 405.

Controller 228 may provide a DC current and/or a series of pulses to open one or more of IGBTs 404 and 406. When controller 228 stops the flow of current to the gates of IGBTs 404 and/or 406, IGBTs 404 and/or 406 "close" by stopping current from passing from the emitter portion to the collector portion of each respective gate. As described herein, IGBTs 404 and 406 may be considered "switches" that open and close according to control signals from controller 228.

Controller 228 may provide active control of current control device 400. By actively controlling the flow of power between power inverter 216 and traction inverter 212, controller 228 may determine a voltage level at traction inverter terminal 408, and responsive to a low voltage level at traction inverter 212, open IGBT 406. In one aspect, it may be desirable to allow power to flow freely in both directions between traction inverter 212 and power inverter 216. Accordingly, controller 228 may monitor voltage and/ or torque command at a particular location and open both of IGBTs 404 and 406 responsive to the monitored voltage and/or the torque command. In another aspect, controller 228 may make a comparison of the voltage level to a predetermined "high" threshold at traction inverter 212, and may close both of IGBT 404 and IGBT 406 responsive to the comparison when the voltage level exceeds the predetermined high threshold. In another aspect, responsive to the monitored voltage, controller 228 may open one or more of IGBTs 404 and 406 partially by providing a current pulse from controller 228. Accordingly, controller 228 may vary the current responsive to the voltage level measurement by selectively increasing or decreasing the pulse frequency delivered to one or more of gate electrode(s) 405.

As used herein, terms including "high," and "low" are understood as relative terms and do not correlate to specific voltages. It is contemplated that predetermined voltage levels may vary, and be application specific.

One advantage of the configuration depicted in FIG. 4 may be the ability to turn the IGBT gates off-and-on at will. In comparison, thyristors 302 and 304 depicted in FIG. 3 can turn off only when the current through the thyristor 302 and 304 from anode to cathode decays to zero. Accordingly, the thyristor configuration depicted in FIG. 3 provides no ability to actively turn-off at will, and may instead rely on the presence of current sloshing to enable reset of the devices.

Figure 5:
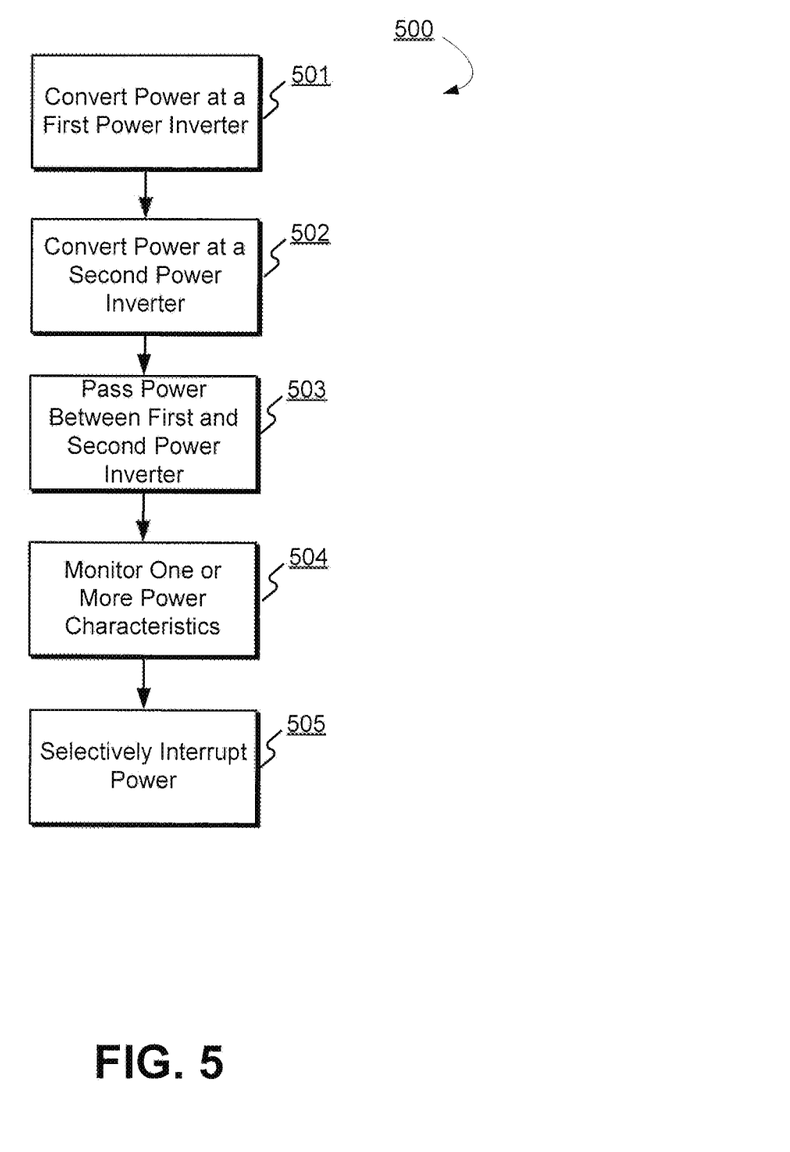
FIG. 5 is a flowchart showing operation of an electric drive having an actively controlled DC bus according to an exemplary disclosed embodiment.

FIG. 5 will be discussed further in the following section to better illustrate the disclosed system and its operation.

INDUSTRIAL APPLICABILITY

The disclosed DC bus current active control system may be applicable to any vehicle that includes electric drive traction control (e.g., an electric or hybrid earth moving machine). The disclosed system may increase power efficiency by removing current ripple from the DC link of the machine's traction control system. The disclosed system may also provide improved ability to diagnose a malfunction in one or more power inverters. For example, when a machine including electric drive traction control experiences a malfunction in one inverter, while the second inverter is operating within normal parameters, the disclosed system may be able to isolate one inverter from the other to ease diagnosing of the problem.

Some machines may include three or more inverters as part of the drive traction control system. Accordingly, an additional benefit may be realized by providing the ability to isolate one or more inverters experiencing a malfunction, while the remaining inverters remain operational. In one aspect, a machine experiencing a fault in one or more inverters may remove the faulty inverters from operation, and continue functioning in a limited capacity to enable the machine to return to a servicing area for repair.

According to another aspect, the disclosed system may provide a method of priming a generator DC link operating on a machine during a priming operation. For example, during machine startup, the DC link on power inverter 216 may include a 45 V DC power supply (not shown) connected to positive DC bus 219. In one aspect, the device controller (e.g., controller 228) may isolate power inverter 216 and DC bus capacitor 224 on power inverter 216. Accordingly, with power source 120 outputting power, machine 100 can bring up the remaining power inverters (e.g., traction inverter 212) and provide full operational power in a shorter period of time from machine startup than with a battery supply alone.

Operation of electric drive 140 will now be described with reference to the flowchart of FIG. 5. The first step of operating electric drive 140 may include inverting power at a first power inverter, such as, for example, at power inverter 216. Power inverter 216 may receive high voltage AC power from one or more connected power supplies such as, for example, generator 180, and invert the power to high voltage DC power (step 501).

At step 502, traction inverter 212 may invert the high voltage DC power to multi-phase AC power. Operation of power inverter 216 and traction inverter 212 in the disclosed electric drive provides bi-directional flow of power from each inverter into and out of common bus 218, which can vary according to one or more power characteristics. Accordingly, at step 503, electric drive 140 may pass power between the first and second power inverters (e.g., between power inverter 216 and traction inverter 212).

Current control device 226 may determine and/or monitor one or more power characteristics (step 504), such as, for example, the voltage using one or more sensors (not shown) located at traction inverter 212 and/or at power inverter 216. Current control device 226 may additionally and/or alternatively monitor one or more other power characteristics, such as current, temperature, torque commands, and/or velocity feedback loops. Based on the one or more power characteristics, current control device 226 may selectively interrupt the passing of power between the first location and the second location (step 505). For example, current control device may monitor voltage level. Responsive to a first low voltage level, current control device 226 may apply a control signal (such as, for example, a DC power signal or a pulse signal) to a gate electrode of a first switch (e.g., thyristor 302) to open the first switch. Current control device may measure a second low voltage level that is lower than a predetermined "low" threshold. The predetermined low threshold may be lower than the first low voltage level. Responsive to a second low voltage level, current control device 226 may apply a control signal to the gate electrode of the first switch (e.g., thyristor 302) and the gate electrode of a second switch (e.g., thyristor 304) to open both of the first switch and the second switch. Responsive to a high voltage level, current control device 226 may cease the control signal delivered to the gate electrodes of the first switch and the second switches (e.g., bring the signal delivered to the gate electrodes to ~0 amps) to the first switch to close the first switch. Accordingly, by actively controlling the power as described above, electric drive 140 may remove an oscillation current between power inverter 216 and traction inverter 212.

It will be apparent to those skilled in the art that various modifications and variations can be made to the disclosed electric drive having an actively controlled DC bus. Other embodiments will be apparent to those skilled in the art from consideration of the specification and practice of the disclosed DC bus current active control system. It is intended that the specification and examples be considered as exemplary only, with a true scope being indicated by the following claims and their equivalents.

What is claimed is:

1. An electric drive system, comprising:
    a first power inverter;
    a second power inverter;
    a positive DC bus connecting the first power inverter and the second power inverter;
    a first switch connected to the positive DC bus between the first power inverter and the second power inverter;
    a second switch connected to the positive DC bus between the first power inverter and the second power inverter; and
    a control unit connected to the first switch and to the second switch, and configured to selectively allow current to pass through the first switch and the second switch.

2. The electrical drive system of claim 1, wherein the first switch and the second switch each include an emitter portion and a collector portion, and are operatively connected in series with the collector portion of the first switch connected to the collector portion of the second switch.

3. The electric drive system of claim 2, wherein the first switch and the second switch are insulated gate bipolar transistors (IGBTs).

4. The electric drive system of claim 1, wherein the first switch and the second switch each include an anode and a cathode, and are connected in parallel with the cathode of the first switch connected to the anode of the second switch, and the cathode of the second switch connected to the anode of the first switch.

5. The electric drive system of claim 4, wherein the first switch and the second switch are thyristors.

6. The electric drive system of claim 1, wherein the control unit provides active current control at the first power inverter and the second power inverter.

7. The electric drive system of claim 6, further comprising a voltage sensor connected to the control unit and configured to measure a voltage level at the second power inverter, wherein the control unit is configured to:
    responsive to a first low voltage level, open the first switch;
    responsive to a second low voltage level, open both of the first switch and the second switch;
    responsive to a high voltage level, close both of the first switch and the second switch; and
    remove an oscillation current from the positive DC bus.

8. The electric drive system of claim 1, further comprising:
    a generator electrically connected to the first power inverter to provide AC power to the first power inverter;
    a DC power supply electrically connected to the positive DC bus; and
    wherein the control unit is configured to isolate the first power inverter from the DC power supply and second power inverter during a priming operation of the electric drive system.

9. The electric drive system of claim 8, further including a power supply connected to the positive DC bus, wherein the control unit is configured to isolate the first power inverter and prime the generator DC link with the power supply.

10. The electric drive system of claim 1, including one or more additional power inverters connected to the positive DC bus.

11. A method for operating a controller comprising:
    inverting power at a first location;
    inverting power at a second location;
    passing power between the first and second locations across a DC bus;
    monitoring a power characteristic at the first and second locations; and
    selectively interrupting, based on the power characteristic, the passing of power between the first location and the second location across the DC bus by:
        responsive to a first power characteristic at the second location, delivering a control signal to allow current to pass in a first direction;

responsive to a second power characteristic at the first location, applying the control signal to allow current to pass in the second direction; and responsive to a third power characteristic at either the first location or the second location, ceasing the control signal to stop the current from passing in either of the first direction or the second direction;

monitoring the passing of power between the first and second locations; and removing an oscillation current between the first and second locations.

12. The method of claim 11 wherein the first power characteristic, the second power characteristic and the third power characteristic are voltage levels.

13. The method of claim 11 wherein the first power characteristic, the second power characteristic and the third power characteristic are torque commands.

14. An electric drive, comprising:
a first power inverter;
a second power inverter;
a positive DC bus connecting the first power inverter and the second power inverter;
a first switch connected to the positive DC bus between the first power inverter and the second power inverter;
a second switch connected to the first switch and the positive DC bus between the first power inverter and the second power inverter; and
a control unit connected to the first switch and to the second switch, and configured to selectively allow current to pass through the first switch and the second switch.

15. The electric drive of claim 14, wherein each of the first switch and the second switch include a first portion and a second portion, the first portion of the first switch being connected to the second portion of the second switch, and the first portion of the second switch being connected to the second portion of the first switch.

16. The electric drive of claim 14, wherein the control unit provides active current control at the first power inverter and the second power inverter.

17. The electric drive of claim 14, further comprising a voltage sensor connected to the control unit and configured to measure a voltage level at the second power inverter, wherein the control unit is configured to:
responsive to a first low voltage level, open the first switch;
responsive to a second low voltage level, open both of the first switch and the second switch;
responsive to a high voltage level, close both of the first switch and the second switch; and
remove an oscillation current from the positive DC bus.

18. The electric drive of claim 17, configured to selectively allow current to pass from the first switch and the second switch by partially opening one or more of the first switch and the second switch.

19. The electric drive system of claim 14, further comprising:
a generator electrically connected to the first power inverter to provide AC power to the first power inverter;
a DC power supply electrically connected to the positive DC bus; and
wherein the control unit is configured to isolate the first power inverter from the DC power supply and second power inverter during a priming operation of the electric drive system.

20. The electric drive of claim 14, wherein the control unit is configured to selectively allow current to pass by:
determining a power characteristic at the second power inverter;
responsive to a first power characteristic, opening the first switch;
responsive to a second power characteristic, opening both of the first switch and the second switch;
responsive to a third power characteristic, closing both of the first switch and the second switch; and
removing an oscillation current from the positive DC bus.

* * * * *